(12) United States Patent
Orbach et al.

(10) Patent No.: US 7,636,896 B1
(45) Date of Patent: Dec. 22, 2009

(54) METHOD AND APPARATUS FOR USABILITY TESTING THROUGH SELECTIVE DISPLAY

(75) Inventors: Julian James Orbach, Macquarie Park (AU); Jennifer Mary Templeman, Ryde (AU)

(73) Assignee: Avaya Inc, Basking Ridge, NJ (US)

( * ) Notice: Subject to any disclaimer, the term of this patent is extended or adjusted under 35 U.S.C. 154(b) by 371 days.

(21) Appl. No.: 10/795,532

(22) Filed: Mar. 8, 2004

(51) Int. Cl.
*G06F 3/048* (2006.01)
(52) U.S. Cl. .................. 715/764; 715/744; 715/789
(58) Field of Classification Search ........... 715/764, 715/704, 745, 744, 789
See application file for complete search history.

(56) References Cited

U.S. PATENT DOCUMENTS

| | | | | |
|---|---|---|---|---|
| 6,064,381 A | * | 5/2000 | Harel | 715/705 |
| 6,781,608 B1 | * | 8/2004 | Crawford | 715/758 |
| 6,976,218 B2 | * | 12/2005 | Stanford-Clark | 715/744 |
| 2004/0139481 A1 | * | 7/2004 | Atlas et al. | 725/135 |

* cited by examiner

*Primary Examiner*—Boris Pesin
(74) *Attorney, Agent, or Firm*—John C. Morgan

(57) ABSTRACT

A method and apparatus used for evaluating usability of displayed material having a plurality of portions by displaying a set of the plurality of portions in an unintelligible format; making intelligible each of the set of the plurality of portions as each is indicated by actions of a user; determining the sequence of the indicated portions; and recording a selection of a subset of the set of the plurality of portions and the determined sequence.

14 Claims, 7 Drawing Sheets

FIG. 1

| STATION BUILER PRO | | | | | | | − | □ | + |
|---|---|---|---|---|---|---|---|---|---|
| File | Edit | View | Insert | Format | Help | | | | |

Task List

Introduction
+ Review Settings
− Define Telephone List
    Edit Telephone List
− Define Incoming Call Rules
    About Pickup Groups
    Define Pickup Groups
    About Coverage Paths
    Define Coverage Paths
+ Define Outgoing Call Rules
+ Define Button Layouts
+ Review Data
  Email Data
  Conclusion

Define Incoming Call Rules

Incoming calls are those made to your organization by external callers, or internal calls from one staff member to another. They are controlled by your telephone system according to a defined set of rules.

Station Builder helps you to define the basic rules that control incoming calls, based on the extension that was dialed.

You can define Pickup Groups and Coverage Answer Groups to:

? control which extensions ring in response to an incoming call

? allow group members to answer calls made to other extensions

You can also define Coverage Paths, which are sets of rules to handle unanswered incoming calls, for example, redirecting them to other extensions or to voicemail after a certain period.

? Click Next to move to the About Pickup Groups task

↗ 103

< Back    Next >
  101      102

FIG. 2

| STATION BUILER PRO | | | |
|---|---|---|---|
| 201 | 202 | 203 | 204 |

| Task List | Define Incoming Call Rules |
|---|---|
| Introduction<br>+ Review Settings<br>- Define Telephone List<br>    Edit Telephone List<br>- Define Incoming Call Rules<br>    About Pickup Groups<br>    Define Pickup Groups<br>    About Coverage Paths<br>    Define Coverage Paths<br>+ Define Outgoing Call Rules<br>+ Define Button Layouts<br>+ Review Data<br>    Email Data<br>    Conclusion | Incoming calls are those made to your organization by external callers, or internal calls from one staff member to another. They are controlled by your telephone system according to a defined set of rules.<br><br>Station Builder helps you to define the basic rules that control incoming calls, based on the extension that was dialed.<br><br>You can define Pickup Groups and Coverage Answer Groups to:<br><br>  ? control which extensions ring in response to an incoming call<br>  ? allow group members to answer calls made to other extensions<br><br>You can also define Coverage Paths, which are sets of rules to handle unanswered incoming calls, for example, redirecting them to other extensions or to voicemail after a certain period.    103<br><br>  ? Click Next to move to the About Pickup Groups task |

| 206 | 207 | 208 | 209 | 211 | 212 | 213 | 214 |
|---|---|---|---|---|---|---|---|

METHOD AND APPARATUS FOR USABILITY TESTING THROUGH SELECTIVE DISPLAY

TECHNICAL FIELD

The present invention relates to improving the usability of systems for users.

BACKGROUND OF THE INVENTION

One of the problems in developing software applications is to design the graphical user interface in a manner that places items in locations that the user will anticipate. A user will subconsciously utilize visual clues on the screen to anticipate where an item that they want will be located. Normally such an item is a visual button which when actuated will perform some action. Determination of what the graphical user interface should look like is referred to as usability tests. Usability tests are experiments to learn how sample users actually use the user interface. A key element of the learning experience is understanding where a user looks on the screen in response to a need. Since by putting items where a user expects to find them, the usability of the software can be improved. The problem is that monitoring a user's eye movement is expensive or slow. Several techniques exist for monitoring or simulating the monitoring the eye movement of users. The first technique is to monitor software usage by analyzing records of actions the user took to draw some conclusion about how the user wants to use the software. A second technique is to automatically monitor the eyeball movements; however, this requires elaborate equipment to be utilized. Further, the equipment is expensive and is not comfortable for a user to utilize. A third technique is to manually monitor the eyeball's movement by taking video pictures of a user as they are utilizing the graphical user interface and at a later point of time by slowing the motion of the video, determining where the eyes were focused. A fourth technique is to conduct interviews with users to determine where the user had looked during the utilization of the graphical user interface. However, the eye movements may be so subconscious that the user may not realize the actual movement of their own eyes or at least not remember it.

SUMMARY OF THE INVENTION

A method and apparatus used for evaluating usability of displayed material having a plurality of portions by displaying a set of the plurality of portions in an unintelligible format; making intelligible each of the set of the plurality of portions as each is indicated by actions of a user; determining the sequence of the indicated portions; and recording a selection of a subset of the set of the plurality of portions and the determined sequence.

BRIEF DESCRIPTION OF THE DRAWING

FIGS. 1-4 illustrate displays of one embodiment of the invention;

DETAILED DESCRIPTION

Figure 4:
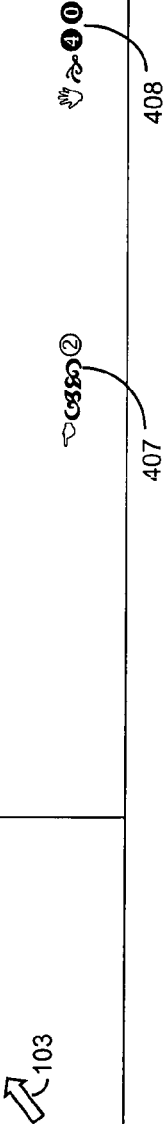

FIG. 1 illustrates a software application that assists a user in determining the rules that a telecommunication switching system will follow in processing calls. Back button 101 and Next button 102 are shown as being placed in a particular position. FIGS. 2-4 illustrate testing embodiments to determine where buttons 101 and 102 should be placed. The cursor that is controlled by the user via a mouse or other input means is cursor 103. The usability test of the graphical user interface illustrated in FIG. 1 is to determine where a user anticipates that Back button 101 and Next button 102 will be located. In one embodiment, this is tested on a group of users by blanking out certain areas of the graphical user interface of FIG. 1. In FIG. 2, sections 201-214 are sections that have been blanked out. The location of these individual sections may or may not be made visible to the user. Cursor 103 is also illustrated in FIG. 2. This embodiment functions by recording the movements of cursor 103 to the various sections before the user finds buttons 101 or 102. As the cursor is positioned over a section, what is underneath the section is displayed to the user as illustrated in FIG. 3 where cursor 103 is positioned in section 213. When the user finally positions cursor 103 in a section and selects that selection by actuation of a key on the keyboard, a button on a mouse, or any other selection means, the system records this as the button or area for which the user was searching. The selection of a button or area is used to determine for which function the user has been searching during the prior movements of the cursor.

The other areas into which the cursor was positioned are also recorded and these indicate, after a statistical analysis, where a group of users have anticipated the Back button 101 or the Next button 102 to be located. For example, if the user consistently positions the cursor first in section 201 of FIG. 2 while they were looking for the Next button 102, this would indicate that Next button 102 should be located in section 201.

In one embodiment, after a section has been entered by cursor 103, the section remains revealed. For example, in FIG. 3 if the user positioned cursor 103 in section 213 but was actually looking for Next button 102, the Back button 101 would continue to be displayed in FIG. 3 even when cursor 103 was moved to section 212. In another embodiment, once the cursor is moved out of a section, such as section 213, the section once again becomes blank. In yet another embodiment, once the cursor 103 is moved out of section 213, section 213 will continue to display the Back button 101 for a predetermined period of time and then section 213 will become blank.

FIG. 4 illustrates another embodiment where icons 401-408 are blurred and the user can only tell that indeed there is an object located at that position. (Until I redo this figure, the reader will have to use their imagination.) When cursor 103 is positioned over an image such as icon 401, icon 401 becomes visible such that the user can determine what it is. In one embodiment, as soon as the user repositions cursor 103 to another location on the graphical user interface illustrated in FIG. 4, the previous image will again be indiscernible by the user. In yet another embodiment, the image will remain visible once made visible by the positioning of cursor 103. In yet another embodiment, the image will only remain visible for a predefined amount of time once cursor 103 is no longer positioned over it.

Figure 5:
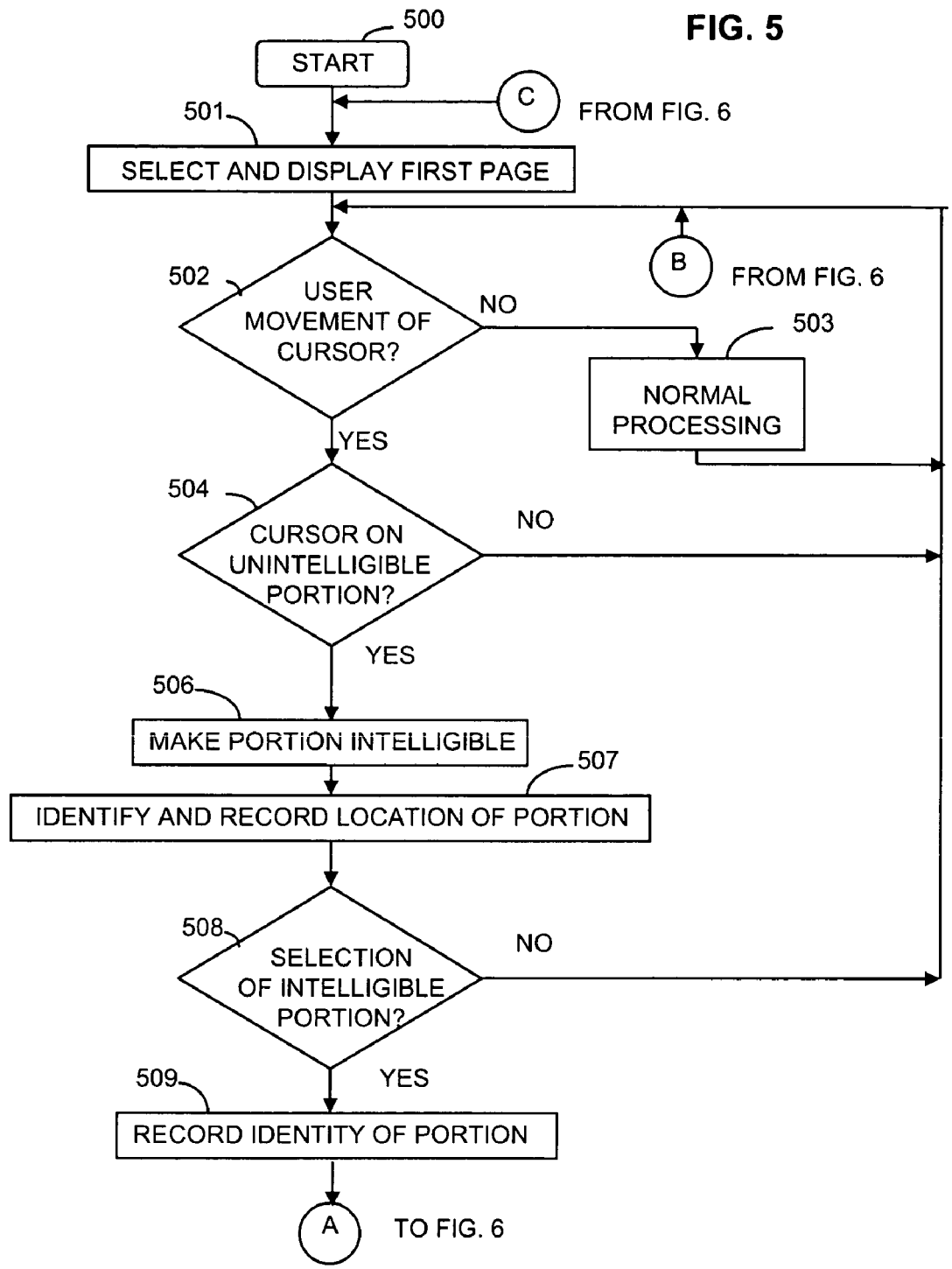
FIGS. 5 and 6 illustrate, in flowchart form, operations performed by one embodiment of the invention.
Figure 6:
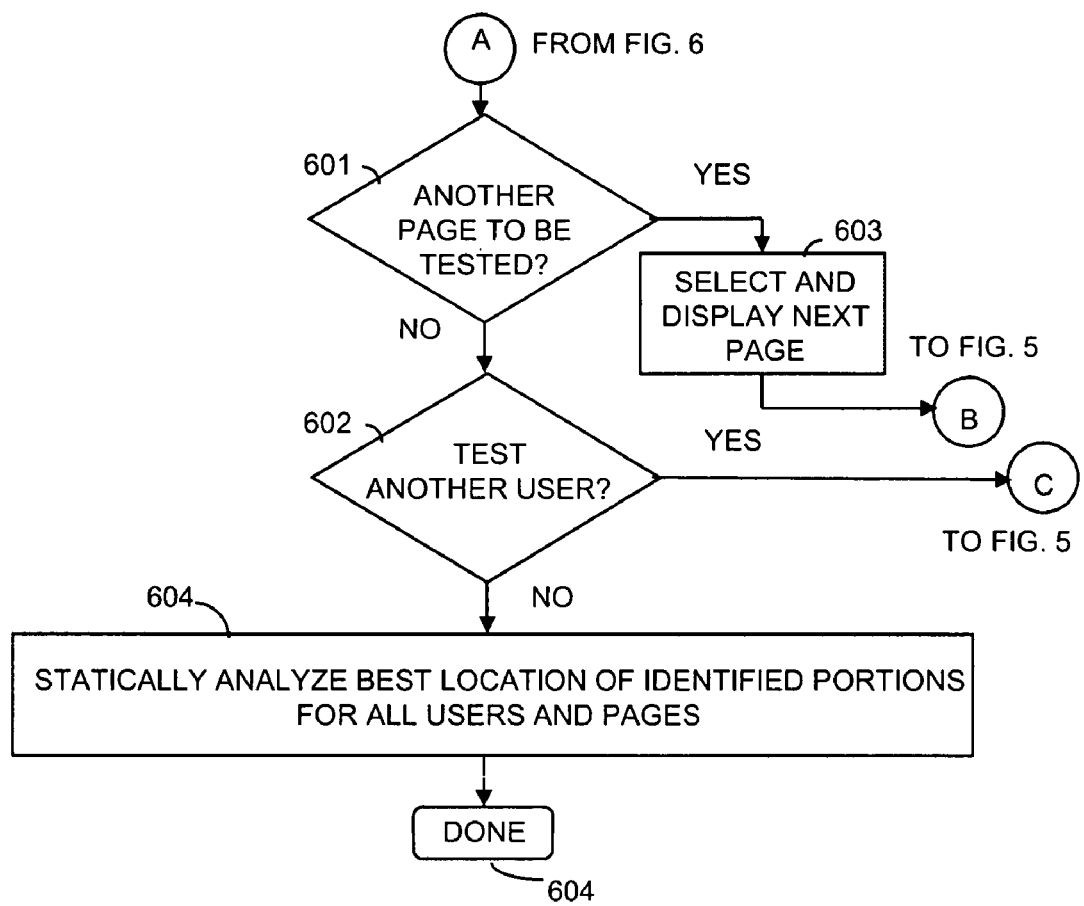

FIGS. 5 and 6 illustrate the operations performed by one embodiment of the invention. FIGS. 5 and 6 illustrate operations that allow the usability testing of a number of users using a number of display screens also referred to as pages. After being started in block 500, block 501 selects and displays the first page of the pages that will be tested for usability by the users. After display of the first page, decision block 502 determines if the user has moved the cursor to another portion of the display screen. If the answer is no, block 503 performs normal processing before returning control back to decision block 502. If the answer in decision block 502 is yes, decision block 504 determines if the user has moved the cursor over a portion of the screen that has been rendered unintelligible. Note, that the pages are displayed initially with all unintelligible portions being shown. If the answer is no in decision block 504, control is transferred back to decision block 502.

If the answer is yes in decision block 504, block 506 makes the unintelligible portion intelligible, and block 507 identifies and records the location of the portion that has been highlighted by the cursor before transferring control to decision block 508. Decision block 508 determines if the user selects the revealed intelligible portion. If the answer is no, control is transferred back to 502. An answer of no in decision block 508 means that the user did not find the desired control element (eg. "Next") for this particular page. If the answer is yes in decision block 508, block 509 records the identity of the selected intelligible portion before transferring control to decision block 601 of FIG. 6. Since the user has found the desired control element on the present page, decision block 601 determines if there is another page to be tested. Note, if the user selects "Back", the previous page will be displayed. If the answer is yes, block 603 selects and displays the next page before returning control back to decision block 502. If the answer is no in decision block 601, decision block 602 determines if the testing is to be performed on another user. If the answer is yes, control is returned back to block 501 of FIG. 5. If the answer is no in decision block 602, block 604 statistically analyzes the best location of the selected portions for all pages using the input of all users. After execution of block 604, block 604 ends the operations illustrated in FIGS. 5 and 6. The statistical analysis can be any method well known to those skilled in the art.

Figure 7:
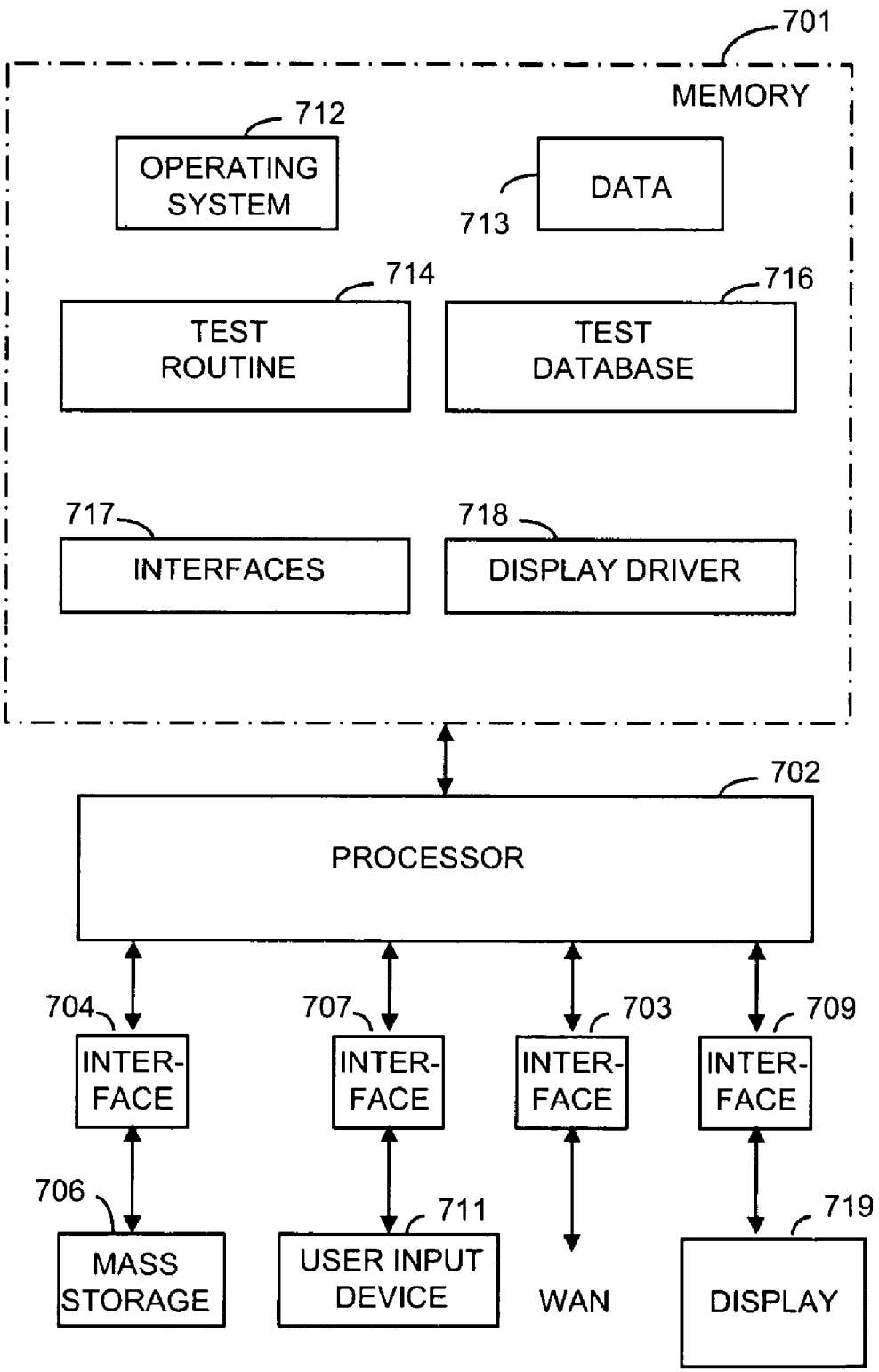
FIG. 7 illustrates, in block diagram form, one embodiment of a computer for implementing the invention.

FIG. 7 illustrates, in block diagram form, a computer for implementing the operations illustrated in FIGS. 5 and 6. Processor 702 performs control functions by executing programs stored in memory 701. Operating system 712 performs the overall control functions. Test routine 714 performs the usability testing by use of display 719 which is interconnected to processor 702 by interface 709. Display driver 718 performs the low level control of display 719 utilizing high level commands received from test routine 714. Test database 716 stores the test results. In addition, processor 702 utilizes interfaces routine 717 to control other devices interconnected to processor 702. Processor 702 also stores data in data block 713. Processor 702 may have mass storage 706 interconnected via interface 704 and a connection to a wide area network via interface 703. User input device 711 comprises a mouse or other cursor control device for controlling the movement of the cursor in display 719 and for performing the selection function. As is well known in the art, user input device 711 may also have other human interface devices such as a keyboard, etc.

When the operations of the IP telephone set, control computer or monitor computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The IP telephone set, control computer, or monitor computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where IP telephone set, control computer or monitor computer is implemented in hardware, IP telephone set, control computer or monitor computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for evaluating usability of displayed material having a plurality of portions, comprising the steps of:
   displaying by a computer together a set of the plurality of portions in an unintelligible format wherein in all portions of the set are selectable;
   making by the computer intelligible each of the set of the plurality of portions as each is indicated by actions of a user as the user searches for a desired one of the set of the plurality of portions;
   determining by the computer a location of each and a sequence of being made intelligible of the indicated portions as each of the set of the plurality of portions is indicated by the user;
   recording by the computer the location and sequence of being made intelligible of the indicated portions wherein all were made intelligible by the step of making and determined by the step of determining;
   detecting by the computer a selection of the desired one of the set of the plurality of portions in response to an action by the user wherein the desired one of the set of the plurality of portions was made intelligible by the step of making, determined by the step of determining and recorded by the step of recording; and
   exchanging by the computer the location of the desired one of the set of the plurality of portions with a location of one of the indicated portions in response to the action by the user.

2. The method of claim 1 wherein the unintelligible format is the set of the plurality of portions hidden.

3. The method of claim 2 wherein the step of making comprises the step of presenting each of the set of the plurality of portions visible to the user.

4. The method of claim 2 wherein the step of exchanging comprises the step of statistically analyzing the recorded determined sequence and locations to determine an arrangement of the location of the desired one of the set of the plurality of portions with the locations of the indicated portions most useful to the user.

5. The method of claim 1 wherein the unintelligible format is the set of the plurality of portions blurred.

6. The method of claim 5 wherein the step of making comprises the step of presenting each of the set of the plurality of portions not blurred to the user.

7. The method of claim 5 wherein the step of exchanging comprises the step of statistically analyzing the recorded determined sequence and locations to determine an arrangement of the location of the desired one of the set of the plurality of portions with the locations of the indicated portions most useful to the user.

8. A computer-readable medium for evaluating usability of displayed material having a plurality of portions, comprising computer-executable instructions configured for:
   displaying together a set of the plurality of portions in an unintelligible format wherein in all portions of the set are selectable;
   making intelligible each of the set of the plurality of portions as each is indicated by actions of a user as the user searches for a desired one of the set of the plurality of portions;
   determining a location of each and a sequence of being made intelligible of the indicated portions as each of the set of the plurality of portions is indicated by the user;
   recording the location and sequence of being made intelligible of the indicated portions wherein all were made intelligible by the step of making and determined by the step of determining;
   detecting a selection of the desired one of the set of the plurality of portions in response to an action by the user wherein the desired one of the set of the plurality of portions was made intelligible by the step of making, determined by the step of determining and recorded by the step of recording; and
   exchanging the location of the desired one of the set of the plurality of portions with a location of one of the indicated portions in response to the action by the user.

9. The computer-readable medium of claim 8 wherein the unintelligible format is the set of the plurality of portions hidden.

10. The computer-readable medium of claim 9 wherein the making comprises presenting each of the set of the plurality of portions visible to the user.

11. The computer-readable medium of claim 9 wherein the exchanging comprises statistically analyzing the recorded determined sequence and locations to determine an arrangement of the location of the desired one of the set of the plurality of portions with the locations of the indicated portions most useful to the user.

12. The computer-readable medium of claim 8 wherein the unintelligible format is the set of the plurality of portions blurred.

13. The computer-readable medium of claim 12 wherein the making comprises presenting each of the set of the plurality of portions not blurred to the user.

14. The computer-readable medium of claim 12 wherein the exchanging comprises statistically analyzing the recorded determined sequence and locations to determine an arrangement of the location of the desired one of the set of the plurality of portions with the locations of the indicated portions most useful to the user.

* * * * *